United States Patent
Berendsen

(10) Patent No.: US 7,480,739 B1
(45) Date of Patent: Jan. 20, 2009

(54) SEGREGATED CACHING OF LINKED LISTS FOR USB

(75) Inventor: John Berendsen, Beaconsfield (CA)

(73) Assignee: NVIDIA Corporation, Santa Clara, CA (US)

( * ) Notice: Subject to any disclaimer, the term of this patent is extended or adjusted under 35 U.S.C. 154(b) by 153 days.

(21) Appl. No.: 10/640,762

(22) Filed: Aug. 13, 2003

(51) Int. Cl.
G06F 3/00 (2006.01)
G06F 13/20 (2006.01)

(52) U.S. Cl. ............ 710/5; 710/6; 710/7; 710/313
(58) Field of Classification Search ............ 710/5, 710/6, 7, 313
See application file for complete search history.

(56) References Cited

U.S. PATENT DOCUMENTS

| | | | | |
|---|---|---|---|---|
| 6,049,850 A | * | 4/2000 | Vishlitzky et al. | 711/136 |
| 6,067,589 A | * | 5/2000 | Mamata | 710/63 |
| 6,513,076 B1 | * | 1/2003 | Chen | 710/10 |
| 6,742,076 B2 | * | 5/2004 | Wang et al. | 710/314 |
| 2003/0005190 A1 | * | 1/2003 | Leete | 710/52 |
| 2003/0079061 A1 | * | 4/2003 | Azzarito et al. | 710/5 |
| 2004/0024915 A1 | * | 2/2004 | Abe | 709/250 |

OTHER PUBLICATIONS

Intel, Universal Host Controller Interface Design Guide, Mar. 1996, Intel, Revision 1.1, pp. 4-7, and 20-34.*
"What is cache?"-a definition from Whatis.com->definition of cache.*

* cited by examiner

Primary Examiner—Alan Chen
(74) Attorney, Agent, or Firm—Townsend and Townsend and Crew LLP

(57) ABSTRACT

Circuits, methods, and apparatus that increase utilization of available USB bandwidth, limit the amount of data accessed from memory, and provide for parallel requests for data from memory. An exemplary embodiment of the present invention caches a pointer for each transfer descriptor in a periodic and async schedule. Several transfer descriptors are also cached. Caching pointers reduces the time needed to organize the needed transfer descriptors to be transmitted. Caching several transfer descriptors eliminates the need to access the main memory each time they are needed. Also, if more transfer descriptors are needed beyond those in cache, memory requests for multiple transfer descriptors may be done in parallel since their pointers are available in cache.

19 Claims, 11 Drawing Sheets

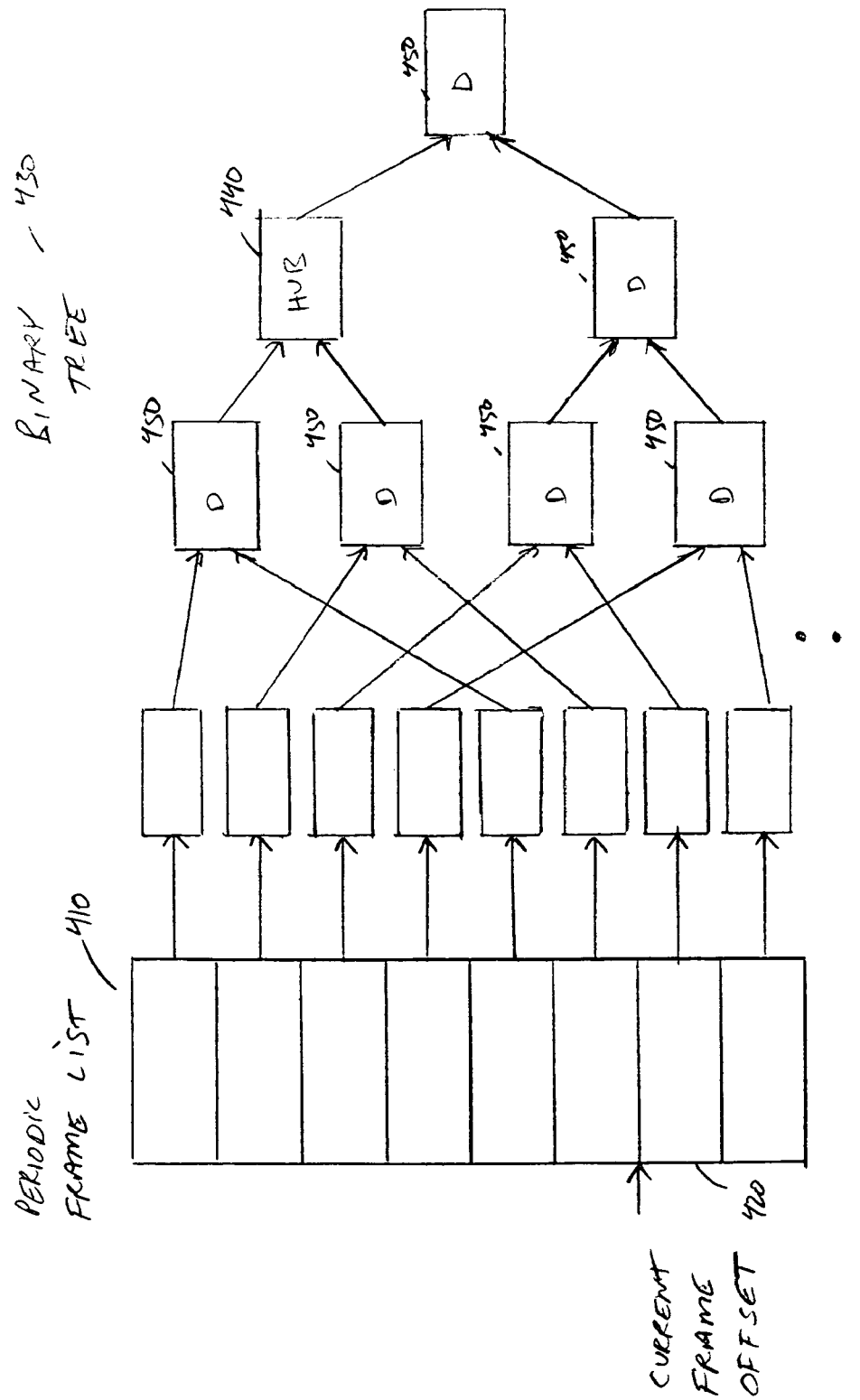

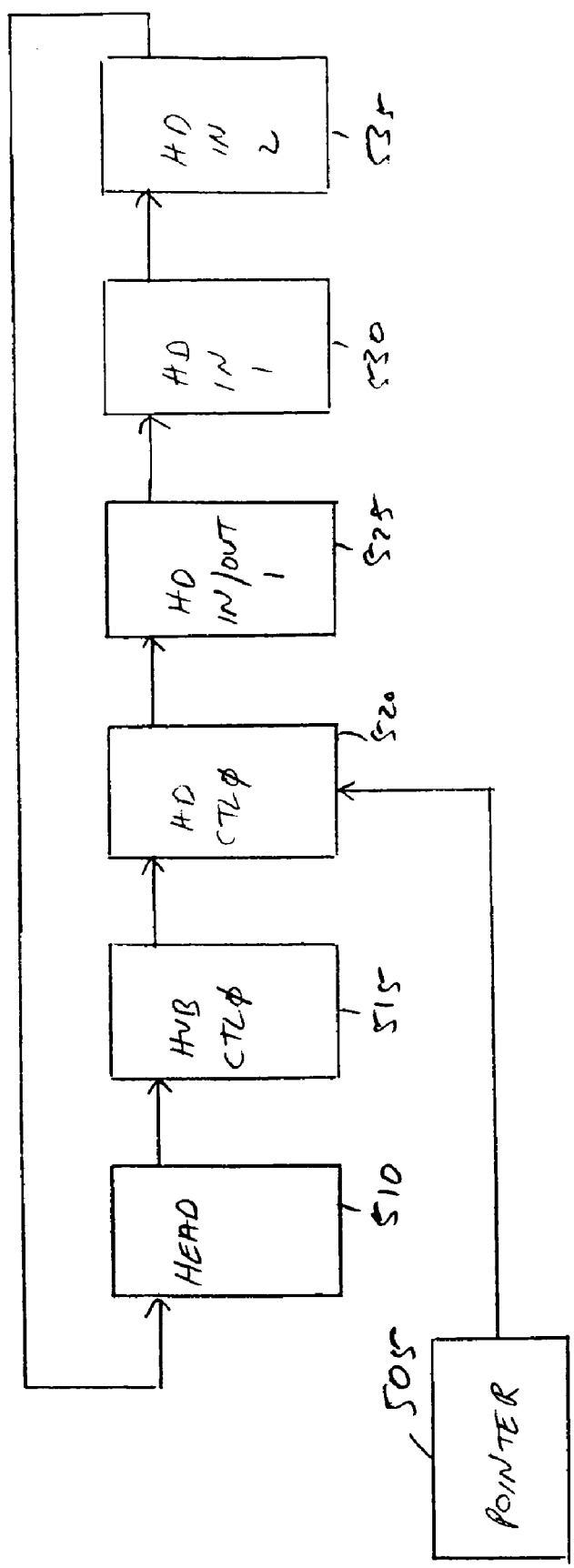

US 7,480,739 B1

SEGREGATED CACHING OF LINKED LISTS FOR USB

BACKGROUND

The present invention relates generally to networking, and more specifically to USB controllers and interface circuits.

Universal Serial Bus (USB) networks have become a very popular way for users to move data between computers and peripheral devices. Specifically, USB networks are used as personal-area wired networks that transfer data between a desktop, notebook or other computer system and devices such as printers, scanners, cameras, speakers, mice, keyboards, and hard disks. A computer may have one or more USB ports, and these may be extended further using one or more hubs. Currently, a new USB standard, USB 2 is becoming popular and replacing the USB 1 standard. USB 2 supports data transfer rates of 480 Mb/s, so called "high speed," while USB 1 supports 12 Mb/s, "full speed" and 1.5 Mb/s, "low speed" data rates. Typically, devices such as mice and keyboards operate at a lower speed to reduce component costs, while higher bandwidth devices, such as camcorders, operate at full speed.

In each of these standards, data is organized into schedules and transmitted over a cable. Unfortunately, it takes time to arrange these schedules and retrieve the necessary data. This slows data transfers and impairing network efficiency.

Moreover, these schedules are formed of linked lists, such that it is not known what data is needed next from memory until the present data is retrieved. This causes at least two difficulties. First, the main memory must be accessed each time data is needed. This consumes system resources, making memory bandwidth unavailable for use by the rest of the computer system. Second, one way to improve efficiency is to perform these memory accesses in parallel. But since the lists are linked, the memory accesses must be done in series, and this performance advantage cannot be gained.

Thus, what is needed are circuits, methods, and apparatus that reduce the time needed to organize data packets for transmission, reduce the amount of data accessed from memory, and provide for multiple accesses of data from memory to be done in parallel.

SUMMARY

Accordingly, the present invention provides circuits, methods, and apparatus that increase utilization of available USB bandwidth, reduce memory accesses, and provide for parallel accesses of the memory.

An exemplary embodiment of the present invention traverses a periodic and async schedule, and stores a pointer for each transfer descriptor in each schedule. Several transfer descriptors are also cached. A specific embodiment stores these caches on an integrated circuit that comprises a Southbridge.

Caching pointers reduces the time needed to organize the needed transfer descriptors to be transmitted. Caching several transfer descriptors eliminates the need to access the main memory each time they are used. Also, if more transfer descriptors are needed beyond those in cache, since their pointers are available in cache, memory requests for multiple transfer descriptors may be done in parallel.

An exemplary embodiment of the present invention provides a computing system. This computing systems includes a CPU, a Northbridge coupled to the CPU, a Southbridge coupled to the Northbridge, a memory coupled to the Northbridge, and a graphics processor coupled to the Northbridge. The Southbridge includes a PC interface configured to couple the Southbridge to the Northbridge, and a USB controller coupled to the PC interface. The USB controller includes a scheduler, a pointer cache coupled to the scheduler, and a data cache coupled to the scheduler.

A further exemplary embodiment of the present invention provides an integrated circuit. This integrated circuit includes a PC interface and a USB controller coupled to the PC interface. The USB controller includes a scheduler, a pointer cache coupled to the scheduler, and a data cache coupled to the scheduler.

Another exemplary embodiment of the present invention provides a USB controller. This USB controller includes a scheduler, a pointer cache coupled to the scheduler, and a data cache coupled to the scheduler.

Still another exemplary embodiment of the present invention provides a method of transferring data over a Universal Serial Bus. This method includes, in a first microframe, traversing a periodic schedule, the periodic schedule comprising a plurality of transfer descriptors, determining which descriptors require work to be done, storing a pointer and a flag for each transfer descriptor in a first portion of a first cache, the pointer corresponding to a memory location for the transfer descriptor and the flag indicating whether the transfer descriptor requires work to be done, and storing the transfer descriptor in a second cache.

This method may further include, in the first microframe, traversing an async schedule, the async schedule comprising at least one transfer descriptor, determining which transfer descriptors require work to be done, storing a pointer and a flag for each transfer descriptor in a second portion of the first cache, the pointer corresponding to a memory location for the transfer descriptor and the flag indicating whether the transfer descriptor requires work to be done, and storing the transfer descriptor in the second cache. Also, the method may include, in a second microframe, traversing the first part of the first cache, traversing the async schedule, determining which transfer descriptors require work to be done, storing a pointer and a flag for each transfer descriptor in the second portion of the first cache, and traversing the second portion of the first cache.

A better understanding of the nature and advantages of the present invention may be gained with reference to the following detailed description and the accompanying drawings.

BRIEF DESCRIPTION OF THE DRAWINGS

FIG. 4 is a diagram representing a periodic schedule that may be used by embodiments of the present invention;

FIG. 5 is a symbolic representation of an async schedule that may be used by an embodiment of the present invention;

DESCRIPTION OF EXEMPLARY EMBODIMENTS

Figure 1A:
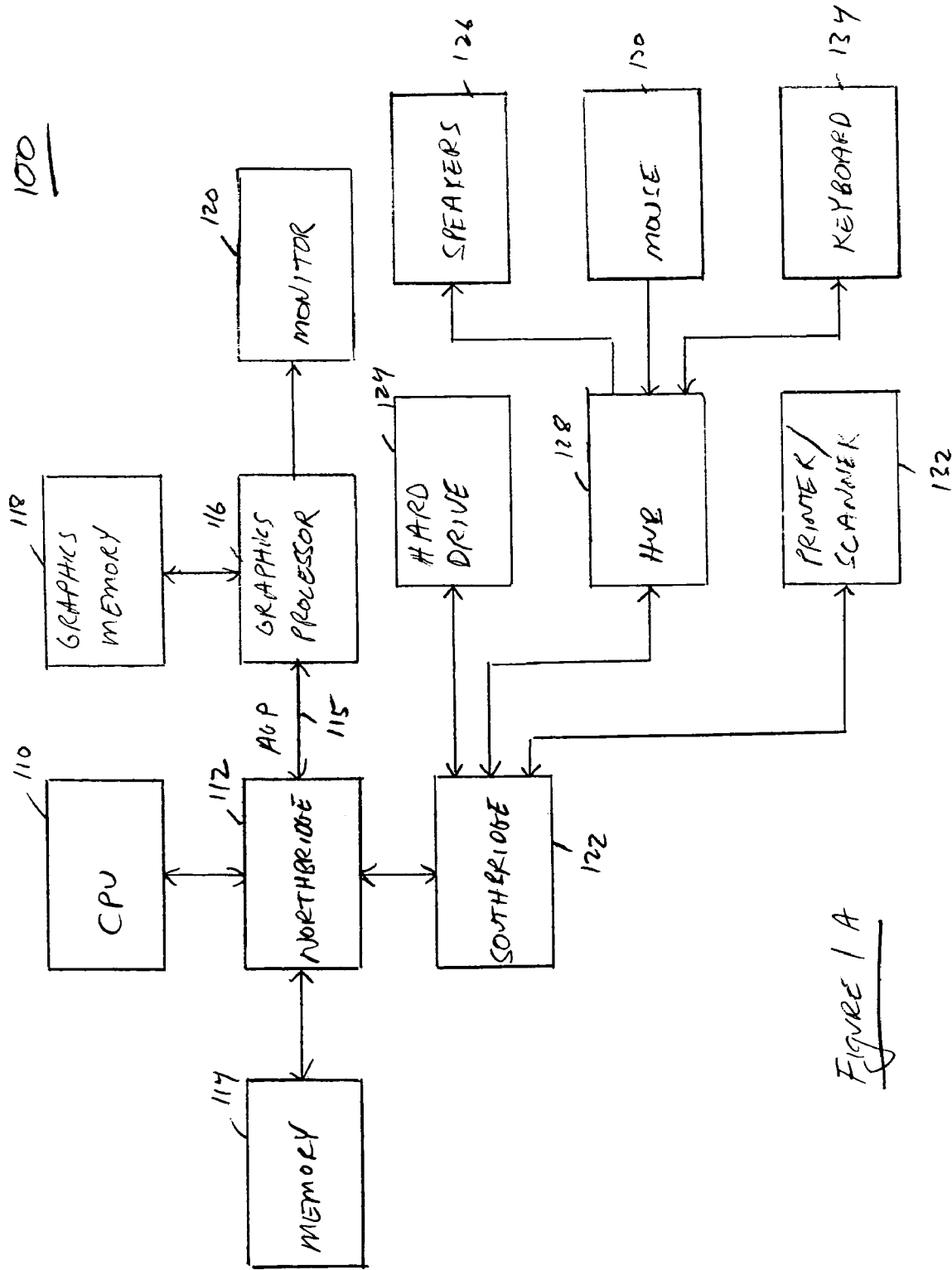
FIG. 1A is a block diagram of a computing system that benefits by incorporation of embodiments of the present invention.

FIG. 1A is a block diagram of a computing system 100 that benefits by incorporation of embodiments of the present invention. Included are a CPU 110, main memory 114, Northbridge 112, Southbridge 122, graphics processor 116, graphics memory 118, display monitor 120, hard drive 124, hub 128, printer/scanner 132, speakers 126, mouse 130, and keyboard 134. This figure, as with all the included figures, is shown for illustrative purposes only, and does not limit either the possible embodiments of the present invention or the claims.

The Northbridge 112 passes information between the CPU 110 and the main memory 114, graphics processor 116, and Southbridge 122. Southbridge 122 interfaces to external communication systems through such connections as USB, serial, Ethernet, and IEEE (1394) ports. The graphics processor 116 receives graphics information over the accelerated graphics port (AGP) bus 115 through the Northbridge 112 from CPU 110. The graphics processor 116 interfaces to graphics memory 118 and provides pixels for display on monitor 120. The graphics memory 118 includes a display buffer which stores the pixels and other graphics data and programs. It will be appreciated by one skilled in the art that there are many variations on this computing system 100. For example, the graphics processor 116 may be included on the Northbridge 112. In this configuration, the graphics memory may be included in the main memory 114, and the Northbridge may drive the monitor 120 directly, or use an external graphics accelerator.

In this example, the Southbridge 122 includes a plurality of USB ports communicating with the hard drive 125, printer/scanner 132, and hub 128, while hub 128 in turn communicates with speakers 126, mouse 130, and keyboard 134. It will be appreciated by one skilled in the art that these components may be connected in alternate configurations, that other components may be included or substituted, and that one or more of these components may be removed. Also, in this specific example, the Southbridge 122 is shown as having devices connected at three USB ports, though the Southbridge 122 may include other number of ports, and these ports may be connected to devices or left open. For example, a Southbridge incorporating embodiments of the present invention may include 4, 6, 8, or another number of USB ports.

As can be seen, some components only receive information from the Southbridge 122, for example, speakers 126. Alternately, some components only provide information to the Southbridge 122, for example, the mouse 130. Other devices both send and receive data to and from the Southbridge 122, for example, the hard drive 124.

Each of these USB connections may be compatible with the USB 1 or USB 2 standards. For example, the mouse 130 and keyboard 134 are often compatible with the lower speed USB 1 standard, while the hard drive 124 is more likely to be compatible with the USB 2 standard, particularly if it is a newer model.

Southbridge 122 provides a communications channel between these USB devices and the remainder of the computing system. Accordingly, it is desirable that the Southbridge 122 utilize the available bandwidth of these USB connections efficiently, and also provide this communications channel in such a way as to limit the consumption of available computing system resources, such as bandwidth to the memory 114.

Figure 1B:
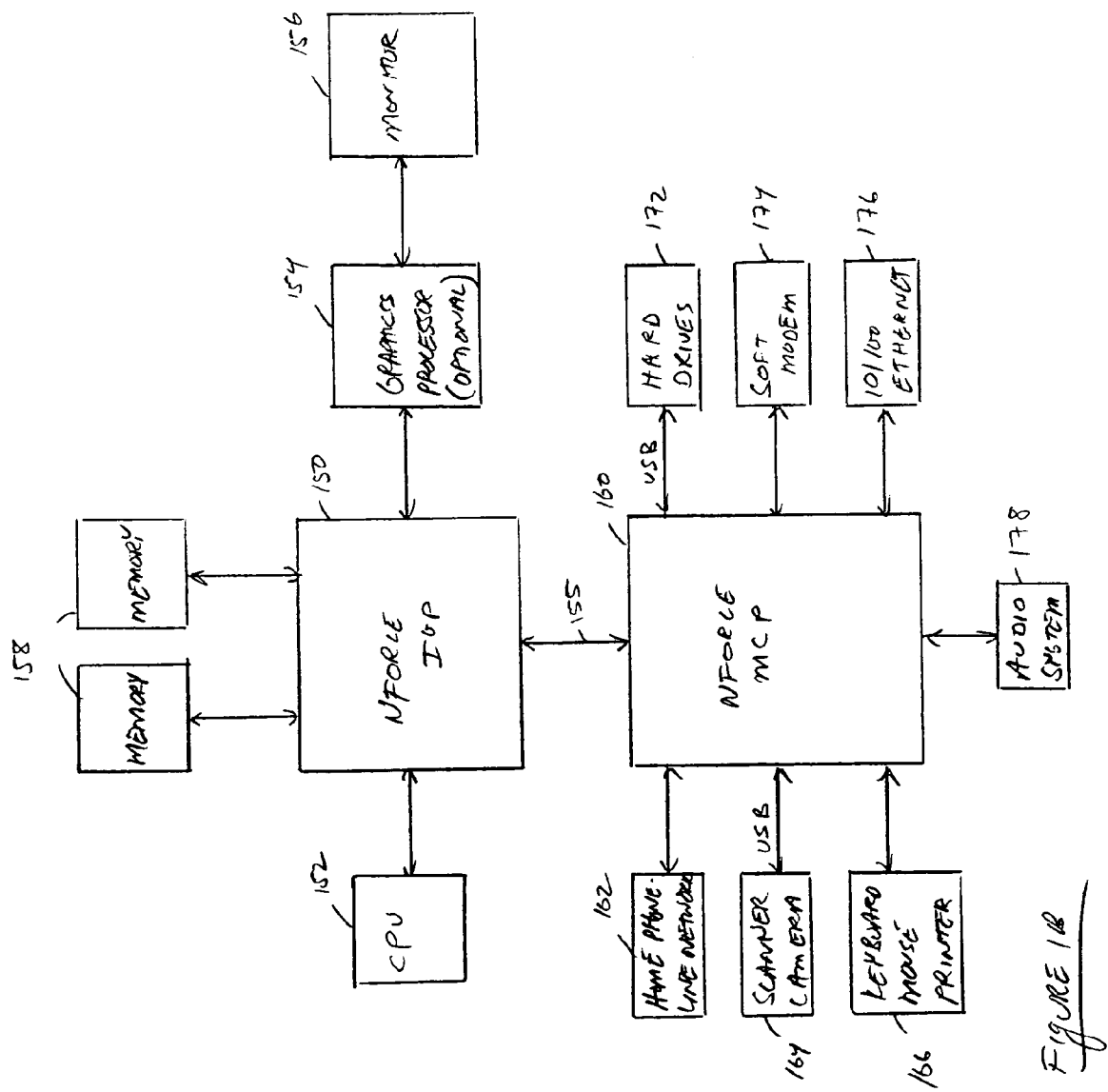
FIG. 1B is a block diagram of an improved computer system that benefits by incorporation of embodiments of the present invention.

FIG. 1B is a block diagram of an improved computer system that benefits by incorporation of embodiments of the present invention. Included are an nForce integrated graphics processor (IGP) 150, an nForce media communications processor (MCP) 160, memories 158, CPU 152, optional graphics processor 154, monitor 156, home phoneline network 162, scanner or camera 164, mouse, keyboard, and printer 166, hard drives 172, soft modem 174, Ethernet connection 176, and audio system 178.

This revolutionary system architecture has been designed around a distributed processing platform, which frees up the CPU to perform tasks best suited to it. Specifically, the nForce IGP 150 includes a graphics processing unit (GPU) which is able to perform graphics computations previously left to the CPU. Also, nForce MCP 160 includes an audio processing unit (APU), which is capable of performing many of the audio computations previously done by the CPU. In this way, the CPU is free to perform its remaining tasks more efficiently. Also, by incorporating a suite of networking and communications technologies such as the home phoneline network 162, USB, and Ethernet 176, the nForce MCP 160 is able to perform much of the communication tasks that were previously the responsibility of the CPU 152.

In this architecture, the nForce IGP 150 communicates with memories 158 using an architecture referred to as the Twinbank™ architecture. The nForce IGP 150 also interfaces to an optional graphics processor 154 over an advanced AGP bus. In various computer systems, this external graphics processor may be removed, and the monitor 156 may be driven by the nForce IGP directly. In other systems, there may be more than one monitor, some or all of which are coupled to optional graphics processors or the nForce IGP directly. The nForce IGP 150 communicates with the nForce MCP 160 over a Hypertransport link 155. The optional graphics processor 154, may also interface with external memory, which is not shown in this example.

The nForce MCP 160 contains controllers for a home phoneline network 162, Ethernet connections 176 and soft modem 174. Also included are an interface for a mouse, keyboard, and printer 166. In this specific examples, USB ports consistent with embodiments of the present invention are provided for cameras and scanners 164 and hard drives 172.

This arrangement allows the CPU, the nForce IGP, and the nForce MCP, to perform processing independently, concurrently, and in a parallel fashion.

It will be appreciated by one skilled in the art that there are many modifications that may be made to this example consistent with the present invention. For example, the number of devices coupled to the nForce MCP via a USB connection and the number of USB ports provided by the nForce MCP may vary. Also, while a computing system has been shown as an exemplary embodiment, embodiments of the present invention may appear in other devices, such as personal digital assistants (PDAs), servers, and other digital systems.

Figure 2A:
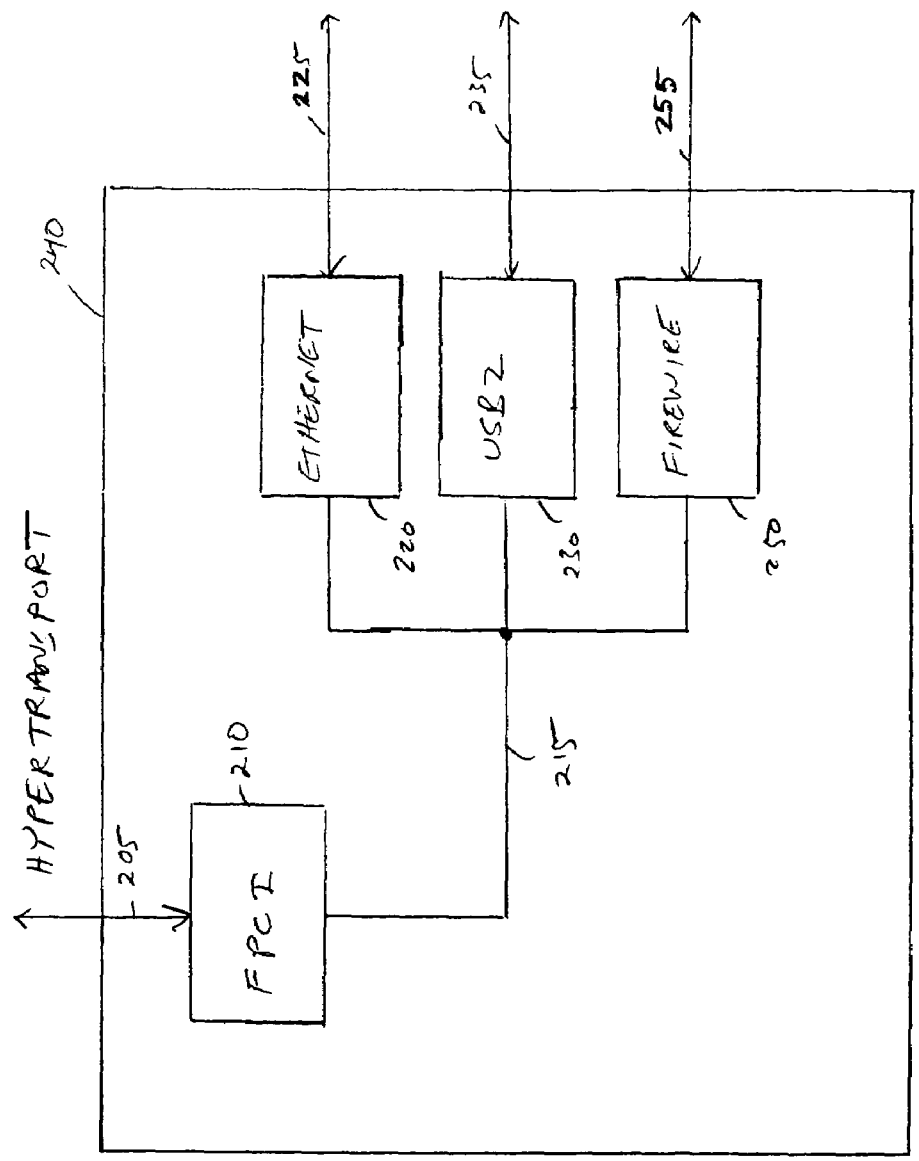
FIG. 2A is a block diagram of a Southbridge circuit that may be used as the Southbridge in FIG. 1, or as a Southbridge in other embodiments of the present invention.

FIG. 2A is a block diagram of a Southbridge circuit that may be used as the Southbridge 140 in FIG. 1, or as a Southbridge in other embodiments of the present invention. Included are a PC interface 210, Ethernet media access controller 220, USB media access controller 230, and IEEE (1394) media access controller 250.

The PC interface 210 may be a fast PC interface communicating with the Northbridge over a Hypertransport channel 205. The fast PC interface 210 provides a signal path 215 over which it communicates with the various media access controllers. The Ethernet MAC 220 provides one or more ports 225, the USB MAC 230 provides one or more ports 235, and the IEEE (1394) or MAC 250 provides one or more ports 255.

Figure 2B:
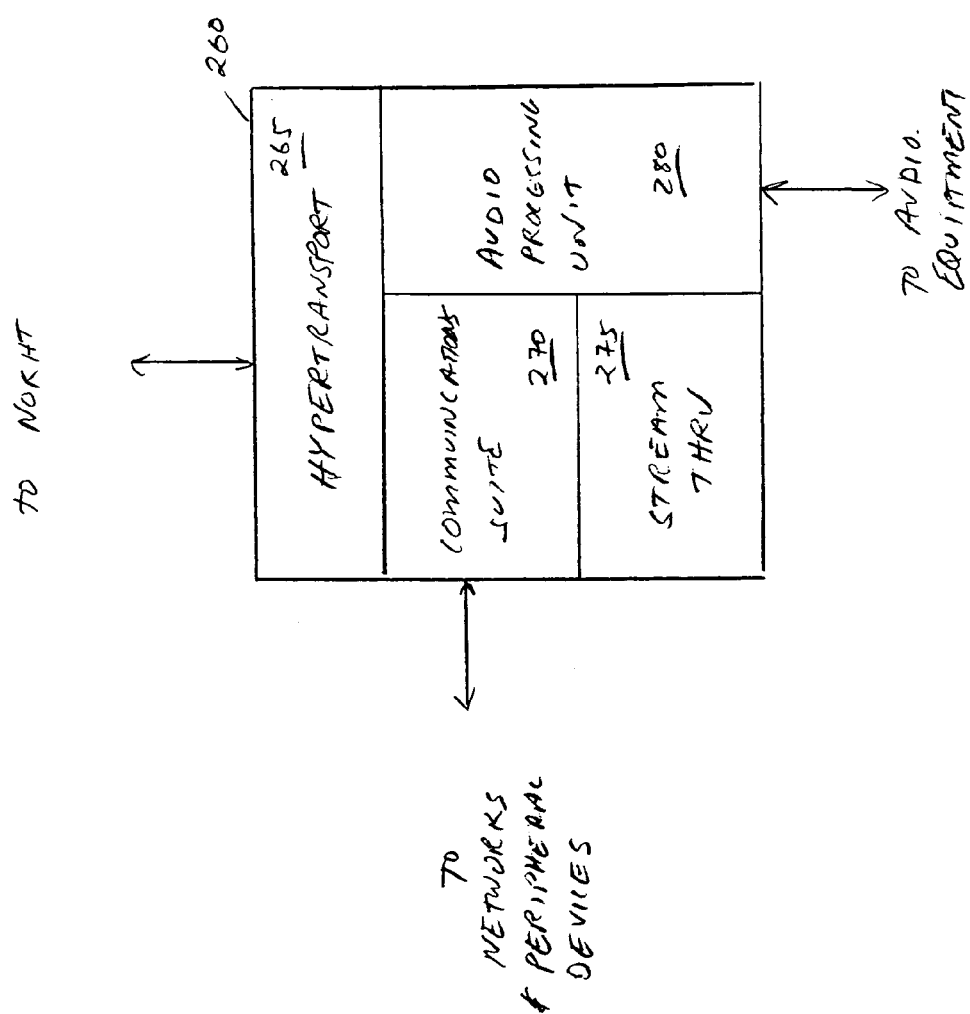
FIG. 2B illustrates an nForce™ MCP that incorporates an embodiment of the present invention.

FIG. 2B illustrates an nForce MCP that incorporates an embodiment of the present invention. Included on the nForce MCP are a Hypertransport interface circuit 265, communications suite 270, StreamThru™ circuitry 275, and audio processing unit (APU) 280.

In a specific embodiment, the APU 280 includes circuitry for a Dolby Digital 5.1 real-time encoder, DirectX® 8.0, and 3D positional audio. This embodiment supports real time processing of 256 simultaneous stereo audio streams. The StreamThru block includes enhanced streaming technology for improved broadband and networking performance. By pairing an integrated 10/100Base-T Ethernet controller to an isochonous-aware internal bus, along with a single-step arbiter, the StreamThru block assists in making streaming video and audio smoother with reduced jitter. The communications suite 270 includes circuitry for home phone line networking, 10/100Base-T Ethernet, and a USB interface that incorporates embodiments of the present invention.

The Southbridge 240 and nForce MCP 260 may each be formed on an integrated circuit, or they may be formed on more than one integrated circuit. Alternately, the Southbridge 240 or nForce MCP 260 may be combined with other circuits on a single integrated circuit.

The USB media access controller in the Southbridge 240 or nForce MCP 260 sends and receives data in the form of packets to and from the USB devices or hubs. Data packets to be sent to devices are scheduled, that is, they are placed in a linked list of packets to be transmitted. Packets are sent during time intervals of 1 ms—this time period is referred to as a frame. Each frame is further subdivided into eight microframes, each 125 us in duration.

These data packets are organized into one of two lists or schedules. Data packets on these lists are sent during each microframe. The lists are referred to as the periodic schedule and the async schedule. The periodic schedule is organized as a binary tree that is traversed from the leaf to root, where the leaf level is the same for 8 consecutive microframes, and incremented each frame. The periodic list provides an isochonous data transfer. Applications requiring a guaranteed bandwidth are placed on the periodic schedule, for example, data, audio, telephony, mice or other pointing devices, and other applications. The periodic schedule is traversed once the beginning at the start of each microframe.

The async schedule is organized as a round-robin loop that is traversed as many times as possible following the periodic schedule, but before in the end of a microframe. The async schedule provides an asynchronous data transfer and is useful for such devices as a hard drive, printer, or scanner.

Figure 3:
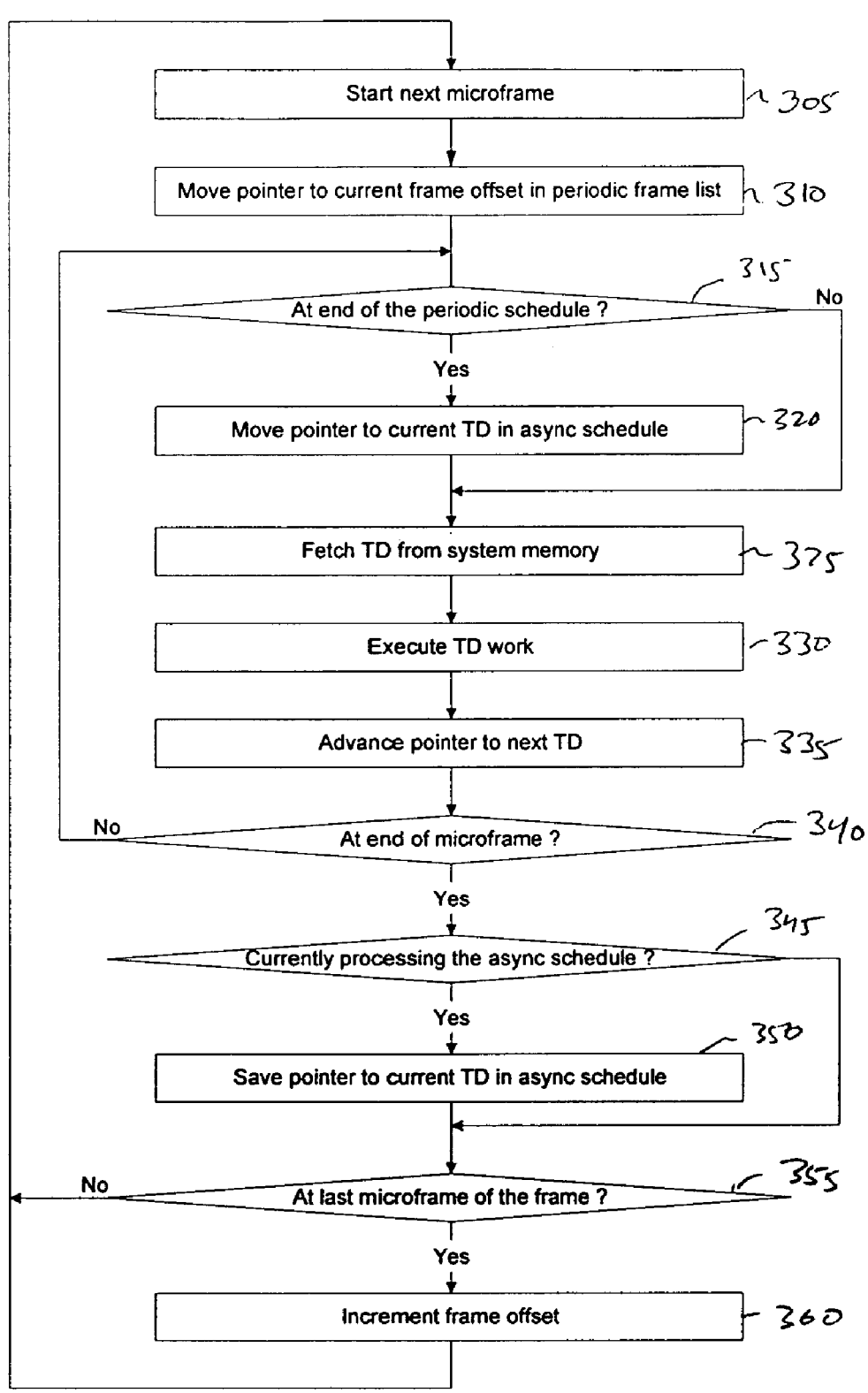
FIG. 3 is a flowchart illustrating a method of transferring data over a USB bus that may incorporate an embodiment of the present invention.

FIG. 3 is a flowchart 300 illustrating a method of transferring data over a USB bus that may incorporate an embodiment of the present invention. A new frame is started in act 305. In act 310, the pointer is moved to the current frame offset in the periodic frame list. In act 315, it is determined whether the end of the periodic schedule has been reached. If not, the transferred descriptor for the current node is fetched from memory in act 325, and any transferred descriptor work to be done is executed in act 330. The work to be done may be high or low speed isochronous transfers, high, full, or low speed interrupts, or other appropriate transaction. In act 335, the pointer is moved to the next transfer descriptor.

If the end of the periodic schedule is reached in act 315, the pointer is moved to the current transfer descriptor in the async schedule in act 320, and transfer descriptors are fetched from memory and executed as before. In act 340, it is determined whether the end of the current microframe has been reached. If not, it is determined in act 315 whether the end of the periodic schedule has been reached. If the end of the microframe has been reached in act 340, it is determined whether the async schedule is currently being processed in act 345. If it is, in act 350 the pointer is saved at the current transfer descriptor in the async schedule. In any event, it is determined whether the last microframe has been reached in act 355. If it is, the frame offset is incremented in act 360. In any event, the next microframe is started in act 305.

FIG. 4 is a diagram representing a periodic schedule that may be used by embodiments of the present invention. Included are a periodic frame list 410, binary tree 430, transfer descriptors 440, and dummy transfer descriptors 450. The periodic frame list 410 is a list of starting points. The current frame offset 420 indicates the leaf in the binary tree 430 where the current traversal will begin. From that leaf, the periodic schedule is traversed to the root. To prevent shuffling of pointers as endpoints are added and removed, dummy descriptors 450 are placed at each node in the binary tree 430 where there is no work to be done. In this specific example, there is work to be done at only one node 440. Using this tree structure, some applications may receive guaranteed bandwidth each microframe, every second microframe, every fourth microframe, and so on. At the start of each frame, the current frame offset 420 is incremented by one space.

FIG. 5 is a symbolic representation of an async schedule that may be used by an embodiment of the present invention. Included are pointer 505, followed by transfer descriptors 510, 515, 520, 525, 530, and 535.

During each microframe, following the traversal of the periodic schedule, the async schedule is traversed as many times as possible until the end of the microframe. The async schedule is arranged in a round-robin fashion, wherein the traversal begins with the transfer descriptor following the transfer descriptor processed last in the previous microframe. For example, if transfer descriptor 515 was the last transfer descriptor processed in a microframe, during the next microframe, the async schedule is traversed beginning with transfer descriptor 520.

Figure 6A:
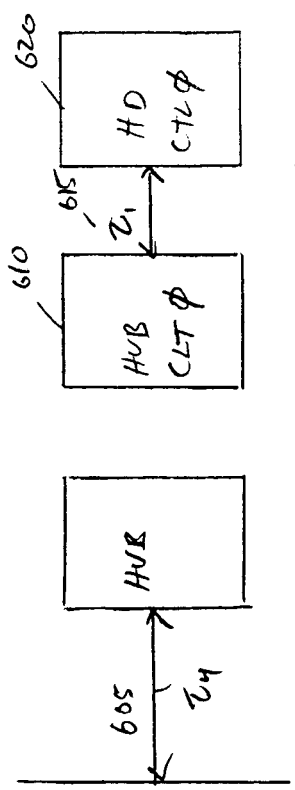
FIGS. 6A-6C are timing diagrams illustrating data packets sent during a microframe.
Figure 6B:
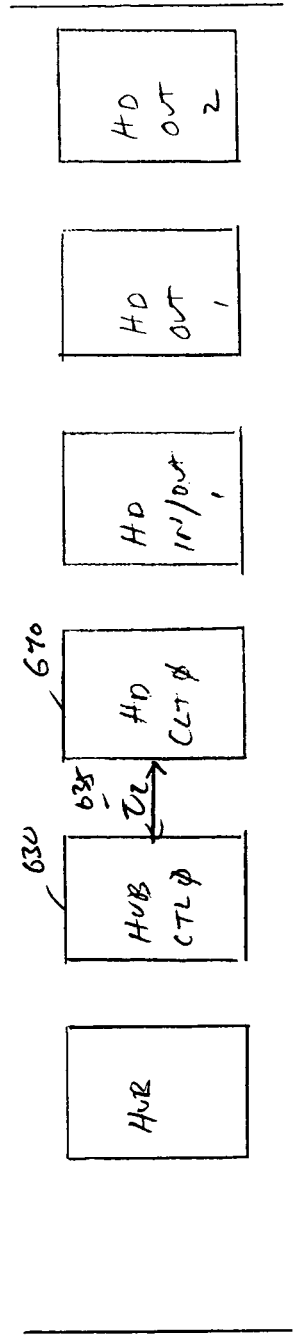
Figure 6C:
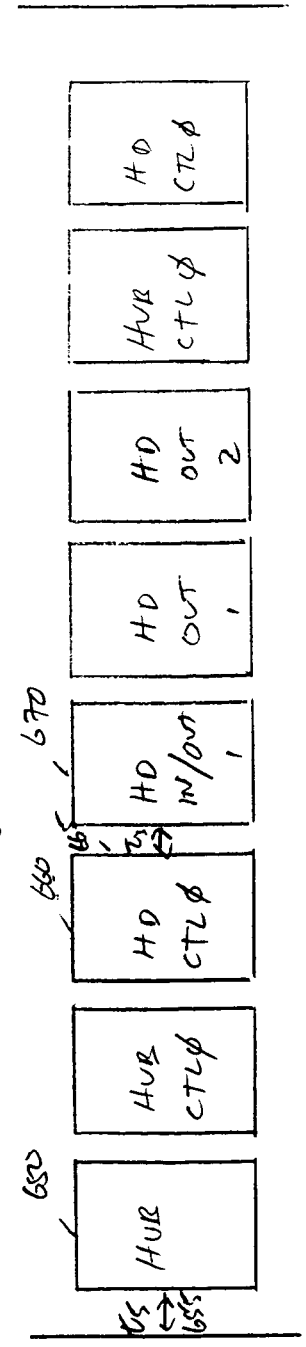

FIGS. 6A-6C are timing diagrams illustrating data packets sent during a microframe. FIG. 6A illustrates packets sent during a frame in a conventional USB system. A first data packet is sent following a delay time $t_4$ 605 after the beginning of a microframe. This delay is due to the retrieval of data from the main memory. Subsequent packets are delayed from each other by an amount $t_1$ 615, which again as a function of the time to retrieve data from memory.

FIG. 6B illustrates data packets sent during a microframe over a USB network where packets are prefetched. Specifically, while one packet is being transmitted, subsequent packets are being prefetched from memory. This results in a reduced time $t_2$ 635 as compared to $t_1$ 615 in FIG. 6A.

FIG. 6C illustrates data packets sent during a microframe over a USB network according to an embodiment of the present invention. As can be seen, packet 650 follows the start of the microframe closely, that is, time $t_5$ 655 is reduced as compared to the time $t_4$ 605 in FIG. 6A. Moreover, subsequent packets follow each other closely.

These improvements are achieved by caching pointers for some or all the transfer descriptor in the periodic and async schedules and caching a number of transfer descriptors. Specifically, a pointer that includes the memory location of the corresponding transfer descriptor is stored in a memory. Also, some number of transfer descriptors are similarly cached. For example, in a specific embodiment, a pointer for each transfer descriptor in the periodic and async schedules is cached, and five transfer descriptors are cached. When more than five transfer descriptors are included in the periodic and async schedules, then the five entry cache overflows. As this happens, previous transfer descriptors are evicted from cache, and new transfer descriptors are stored. In one embodiment, to reduce the time of the first data transfer at the beginning of a microframe, the first two transfer descriptors in the periodic schedule are not evicted, but remain in cache as essentially a prefetch for the beginning of the next microframe. In other embodiments, there are other numbers of transfer descriptor cache entries, or different numbers of transfer descriptor cache entries are retained in the event of an overflow.

In various embodiments, the pointer cache is cleared at various times. Specifically, the pointer cache can be divided into a periodic cache and an async cache, where the periodic cache stores pointers corresponding to transfer descriptors in the periodic schedule, and the async cache stores pointers corresponding to transfer descriptors in the async schedule. In one embodiment, the periodic cache is cleared each frame, since it is known that the same periodic schedule is used for each microframe in a frame, but changes at each frame.

It is also desirable to change the async cache at regular intervals. If the async cache is not updated, there may be a change in the schedule which is not picked up, and transfers during some number of frames may be missed, thus reducing efficiency. Accordingly, one embodiment of the present invention flushes or clears this cache each microframe. Often the async schedule has only one transfer descriptor requiring work, and this one is repeated several times after the periodic schedule and before the end of the microframe. Accordingly, flushing the async cache each microframe delays the first transfer descriptor access, but improves further accesses during the microframe and ensures that the async cache remains updated. In other embodiments, this flushing may occur each frame. Alternately, this flushing may be programmable or otherwise variable, or done each time there is a change in the async schedule.

Accordingly, the timing shown in FIG. 6C is slightly modified in one embodiment of the present invention. Specifically, at the beginning of a frame, time $t_5$ 655 is longer as the periodic cache is updated. During later microframes, time $t_5$ 655 is reduced as the pointer and corresponding transfer descriptors are available in cache. Also, in each micro frame, the first traverse through the microframe is delayed as the async cache is updated, while the transfer descriptors in following traversals are more closely spaced since pointers, and perhaps some transfer descriptors, depending on previous overflows, are available in cache.

Figure 7B:
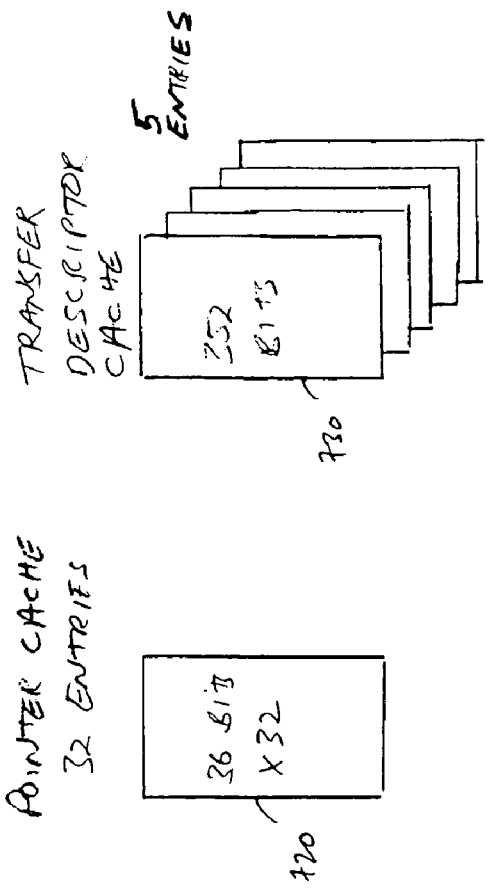
FIGS. 7A and 7B illustrate apparatus for caching pointers and transfer descriptors according to an embodiment of the present invention.
Figure 7A:
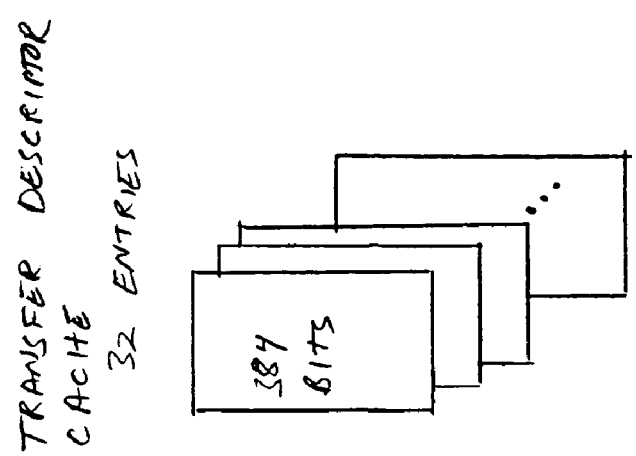

FIGS. 7A and 7B illustrate apparatus for caching pointers and transfer descriptors according to an embodiment of the present invention. FIG. 7A illustrates a straightforward method of caching where each transfer descriptor in the periodic and async schedules are cached in their entirety. As is shown, this simple scheme requires memory storage of 1536 bytes.

FIG. 7B illustrates a segregated cache architecture consistent with an embodiment of the present invention. As can be seen, a pointer cache 720 consisting of 32 entries, each 36 bits long, is used to store the pointer for each of the transfer descriptors in the periodic and async schedules. Additionally, a flag may be associated with each entry indicating whether work is to be done for each associated transfer descriptor. Also, several transfer descriptors are stored in code 730. In this specific embodiment, there are five entries each 132 bits in size. This architecture, as can be seen, consumes 366 bytes of memory, an amount which is greatly reduced from the simple approach of FIG. 7A.

Again, in this specific example, five transfer descriptors are cached. In other embodiments, different numbers of transfer descriptors may be cached. For example, three, four, six, or more transfer descriptors may be cached. In a specific embodiment, in the event of a cache overflow, that is, more than five transfer descriptors are present in the periodic and async schedules, the first two entries are retained, while later entries are evicted as needed. In this way, during the next microframe, the first two transfer descriptors are available in cache.

Figure 8:
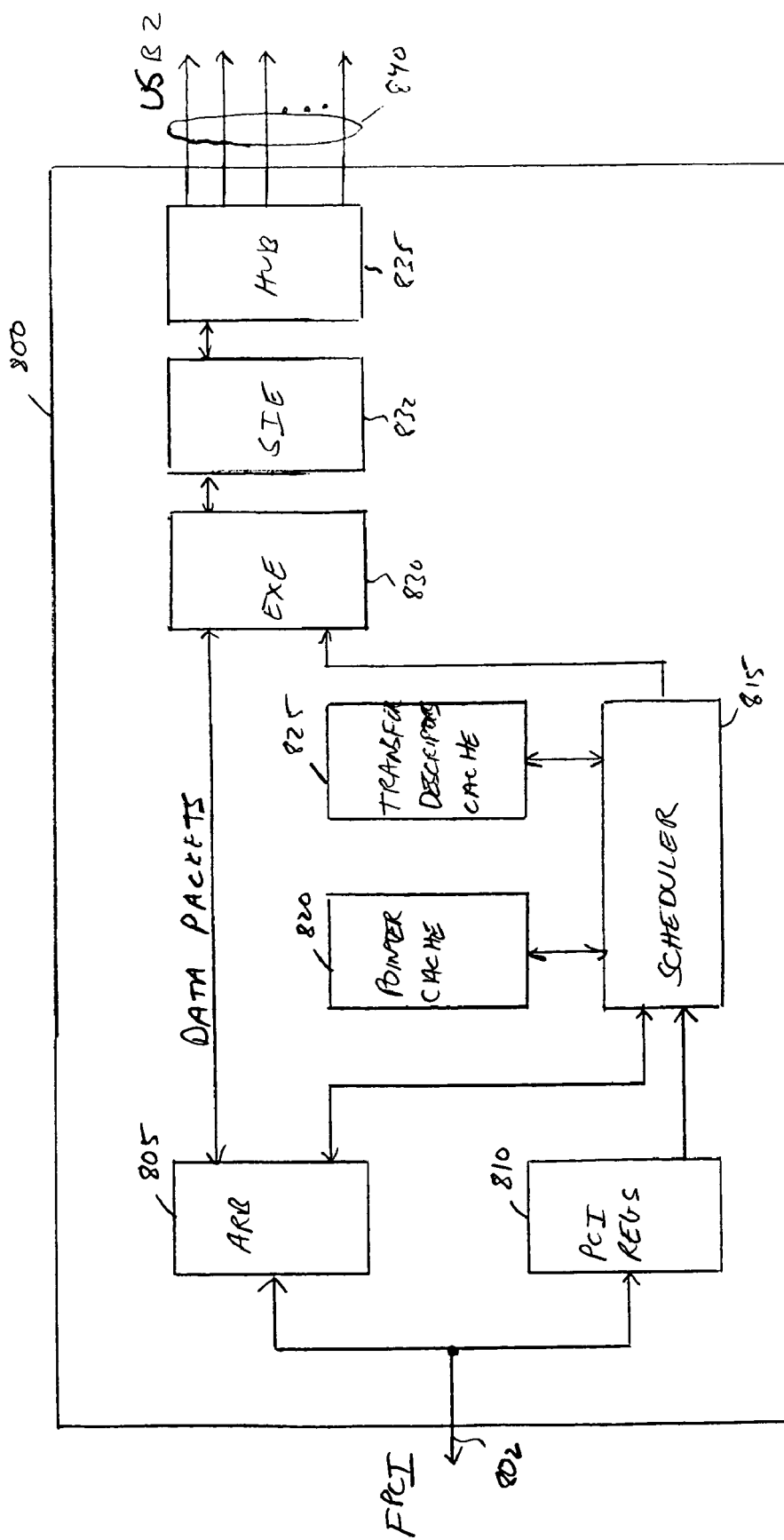
FIG. 8 is a block diagram of a USB media interface controller or controller consistent with an embodiment of the present invention.

FIG. 8 is a block diagram of a USB MAC or controller consistent with an embodiment of the present invention. Included are abritrator 805, PCI registers 810, scheduler 815, pointer cache 820, transfer descriptor cache 825, USB execution unit 830, serial interface engine (SIE) 832, and USB hub 835. A PCI interface is available for coupling to other circuits in the Southbridge at Port 802. One or more USB connections are available at Port 840. Each of these USB ports may connect to a USB compatible device or hub.

Arbiter 805 controls the interface of the controller with the PCI bus 802. Specifically, data is provided to be USB execution unit 830, and scheduling information is provided and to the scheduler 815. Also, the arbiter 805 provides memory requests received from the scheduler 815 and data received from the USB execution unit 830 to the Northbridge over the PCI bus 802. The PCI registers 810 store data configuration information for the controller.

The scheduler 815 receives scheduling information and makes memory requests through the arbiter 805. The scheduler receives pointers from pointer cache 820, which identify memory locations for transfer descriptors in the periodic and async schedules. The scheduler 815 also receives flag information from the pointer cache 820 indicating whether the corresponding transfer descriptors require work. The transfer descriptors requiring work are retrieved from the transfer descriptor cache 825. The execution unit 830 sends and receives data to and from the serial interface engine 832. The execution unit 830 determines which data packets are sent on which USB ports 840. The SIE 832 receives transactions from the EXE 830 and converts them into serial bit streams. The SIE 832 is also responsible for managing the frame and microframe intervals, as well as other timing contraints required by the USB 2 specification. Hub 835 acts as a physical interface to the USB ports 840.

Figure 9:
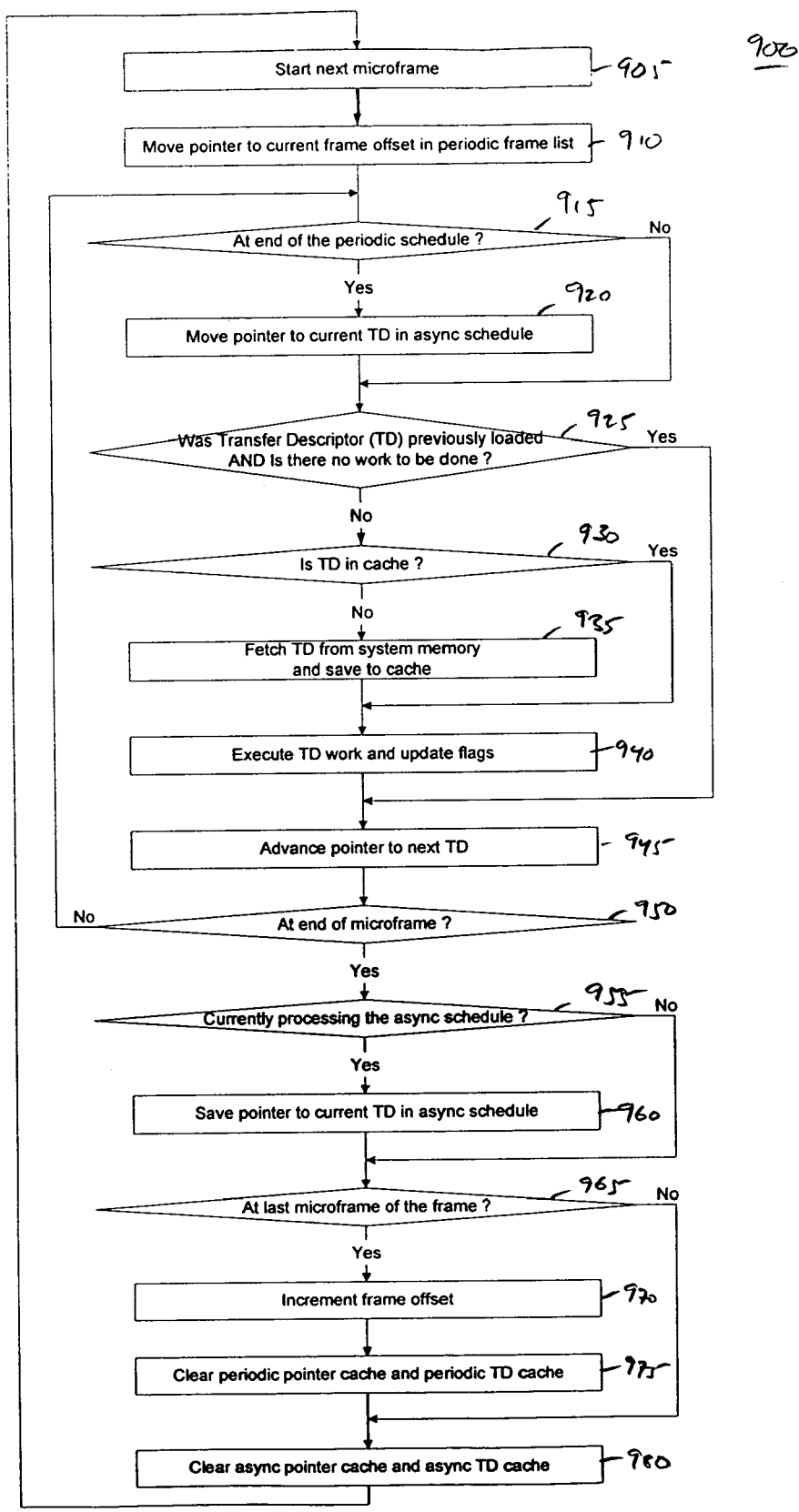
FIG. 9 is a flowchart of a method of transferring data consistent with an embodiment of the present invention.

FIG. 9 is a flowchart of a method of transferring data consistent with an embodiment of the present invention. In act 905, the next microframe (or first microframe) is begun. A pointer is moved to the start of the periodic schedule in act 910. In act 915, it is determined whether the end of the periodic schedule has been reached. If it has not, then it is determined in act 925 whether a transfer descriptor at the present node in the periodic schedule has been previously loaded and that there is no work to be done. If the transfer descriptor at that node has previously been loaded and there is no work to be done, the pointer may move to the next transfer descriptor in act 945.

If that is not the case, that is, either the transfer descriptor was not previously loaded or there is work to be done, then it is determined whether that transfer descriptor has been cached in act 930. If it has, then the transfer descriptor work can be executed, and any flag indicating whether work is to be done or not is updated in act 940. If the transfer descriptor is not in cache, it is fetched from the system memory in act 935, and once it is fetched, the transfer descriptor work is done, the transfer descriptor is cached, and the flag updated. Once the transfer descriptor work has been done, and the flag is been updated in 940, and the pointer moves to the next transfer descriptor in act 945.

It is determined whether the end of microframe has been reached in act 950. If not, it is determined once again whether the end of the periodic schedule has been reached in act 915. Once the end of the periodic schedule has been reached, the pointer moves to the current transfer descriptor in the async schedule, as is shown in act 920. From there, progress is made through the async schedules as before.

Once the end of the microframe has been reached in act 950, it is determined whether the async schedule was being processed at the end of the microframe. If it has, a pointer is saved at the current transfer descriptor in the async schedule, in act 960. In any event, it is determined in act 965 whether the last microframe in the frame has been reached. If it has not, the async pointer and transfer descriptor caches are cleared in act 980. Again, in other embodiments of the present invention, the async pointer and transfer descriptor caches may be cleared at other times. Once the last microframe is reached in act 965, the frame offset is incremented in act 970, the periodic pointer and transfer descriptor caches are cleared in act 975, the async pointer cache and transfer descriptor caches are cleared in act 980, and the next microframe is begun in act 905.

Again, in this specific example, the async schedule pointer and transfer descriptor caches are cleared each microframe, while the periodic schedule pointer and transfer descriptor caches are cleared each frame. In other embodiments, these caches may be cleared at other times. Accordingly, in this example, the periodic schedule pointers and transfer descriptors are cached during the first microframe in each frame, while the async schedule pointers and transfer descriptors are cached each microframe. Again, if a cache overflow occurs, some transfer descriptors may be evicted, while others are saved in cache as essentially a prefetch for the next micro frame.

In a specific embodiment of the present invention, a single "current pointer" is used to track progress through both the periodic and async schedules. At the beginning of each microframe, the current pointer is loaded at the start of the periodic schedule, act 910. Each time the current pointer is moved to a next transfer descriptor, act 945, the current pointer advances through the periodic schedule until a "end of periodic schedule pointer" is reached. At that time the current pointer with the address of the current transfer descriptor in the async schedule is loaded. The async schedule is then parsed in a round robin fashion until the end of the microframe. At the end of the microframe, the current pointer is saved showing the current transfer descriptor in the async schedule, such that the async schedule is started at the correct transfer descriptor in the next microframe. The function of the current pointer should not be confused with pointers in the periodic and async pointer caches, which are pointers showing the locations of transfer descriptors in memory.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. A computing system comprising:
   a CPU;
   a Northbridge coupled to the CPU;
   a Southbridge coupled to the Northbridge; and
   a system memory coupled to the Northbridge;
   wherein the Southbridge comprises:
      a PC interface configured to couple the Southbridge to the Northbridge; and
      a USB controller coupled to the PC interface, wherein the USB controller comprises:
         a scheduler that processes at least one schedule of transfer descriptors;
         a pointer cache coupled to the scheduler and configured to cache a plurality of pointers identifying locations in the system memory for the transfer descriptors in the schedule, wherein the pointer cache stores the pointer for each of the transfer descriptors in the schedule; and
         a data cache coupled to the scheduler and configured to cache only a portion of the plurality of transfer descriptors in the schedule.

2. The computing system of claim 1 wherein the pointer cache comprises entries for at least one transfer descriptor in a periodic schedule.

3. The computing system of claim 2 wherein each entry in the pointer cache comprises one or more bits indicating whether activity is required by the corresponding transfer descriptor.

4. The computing system of claim 1 wherein the pointer cache comprises entries for at least one transfer descriptor in an asynchronous schedule.

5. The computing system of claim 4 wherein each entry in the pointer cache comprises one or more bits indicating whether activity is required by the corresponding transfer descriptor.

6. The computing system of claim 1 wherein the data cache comprises at least one transfer descriptor in the periodic schedule that requires activity.

7. The computing system of claim 1 wherein the data cache comprises at least one transfer descriptor in the asynchronous schedule that requires activity.

8. The method of claim 1 wherein the USB controller further comprises:
   an arbiter coupled between the PC interface and the scheduler.

9. The computing system of claim 1, wherein the USB controller is adapted to retrieve in parallel at least two transfer descriptors from the system memory when the at least two transfer descriptors are not in the data cache.

10. A USB controller comprising:
    a scheduler;
    a pointer cache coupled to the scheduler and configured to cache a plurality of pointers identifying memory locations for a plurality of transfer descriptors; and
    a data cache coupled to the scheduler and configured to cache at least two of the plurality of transfer descriptors,
    wherein each entry in the pointer cache comprises one or more bits indicating whether activity is required by the corresponding transfer descriptor.

11. The USB controller of claim 10 wherein the pointer cache comprises entries for at least one transfer descriptor in a periodic schedule.

12. The USB controller of claim 10 wherein the pointer cache comprises entries for at least one transfer descriptor in an asynchronous schedule.

13. A method of transferring data over a Universal Serial Bus comprising:
- in a first microframe, traversing a periodic schedule, the periodic schedule comprising a plurality of transfer descriptors;
- determining which transfer descriptors require work to be done;
- storing a pointer and a flag for each transfer descriptor in a first portion of a first cache, the pointer corresponding to a memory location for the transfer descriptor and the flag indicating whether the transfer descriptor requires work to be done; and
- storing a plurality of transfer descriptors in a second cache.

14. The method of claim 13 further comprising:
- in the first microframe, traversing an async schedule, the async schedule comprising at least one transfer descriptor;
- determining which transfer descriptors require work to be done;
- storing a pointer and a flag for each transfer descriptor in a second portion of the first cache, the pointer corresponding to a memory location for the transfer descriptor and the flag indicating whether the transfer descriptor requires work to be done; and
- storing the transfer descriptor in the second cache.

15. The method of claim 14 further comprising:
- in a second microframe, traversing the first part of the first cache;
- traversing the async schedule;
- determining which transfer descriptors require work to be done;
- storing a pointer and a flag for each transfer descriptor in the second portion of the first cache; and
- traversing the second portion of the first cache.

16. The method of claim 15 further comprising:
flushing the first portion of the first cache each frame.

17. The method of claim 16 further comprising:
flushing the second portion of the first cache once each microframe.

18. A method of transferring data over a Universal Serial Bus comprising:
- determining a plurality of transfer descriptors, each transfer descriptor stored in a memory location;
- caching a plurality of pointers, each pointer identifying the memory location of a transfer descriptor; and
- caching a first number of the plurality of transfer descriptors, where the first number is greater than one and less than the number of pointers cached.

19. The method of claim 18 wherein the first number of the plurality of transfer descriptors comprises a first transfer descriptor and a second transfer descriptor, wherein the first transfer descriptor is used before the second transfer descriptor when a schedule is traversed; and the method further comprises:
- evicting the second transfer descriptor and writing a third transfer descriptor without evicting the first transfer descriptor.

* * * * *